Patented Jan. 9, 1923.

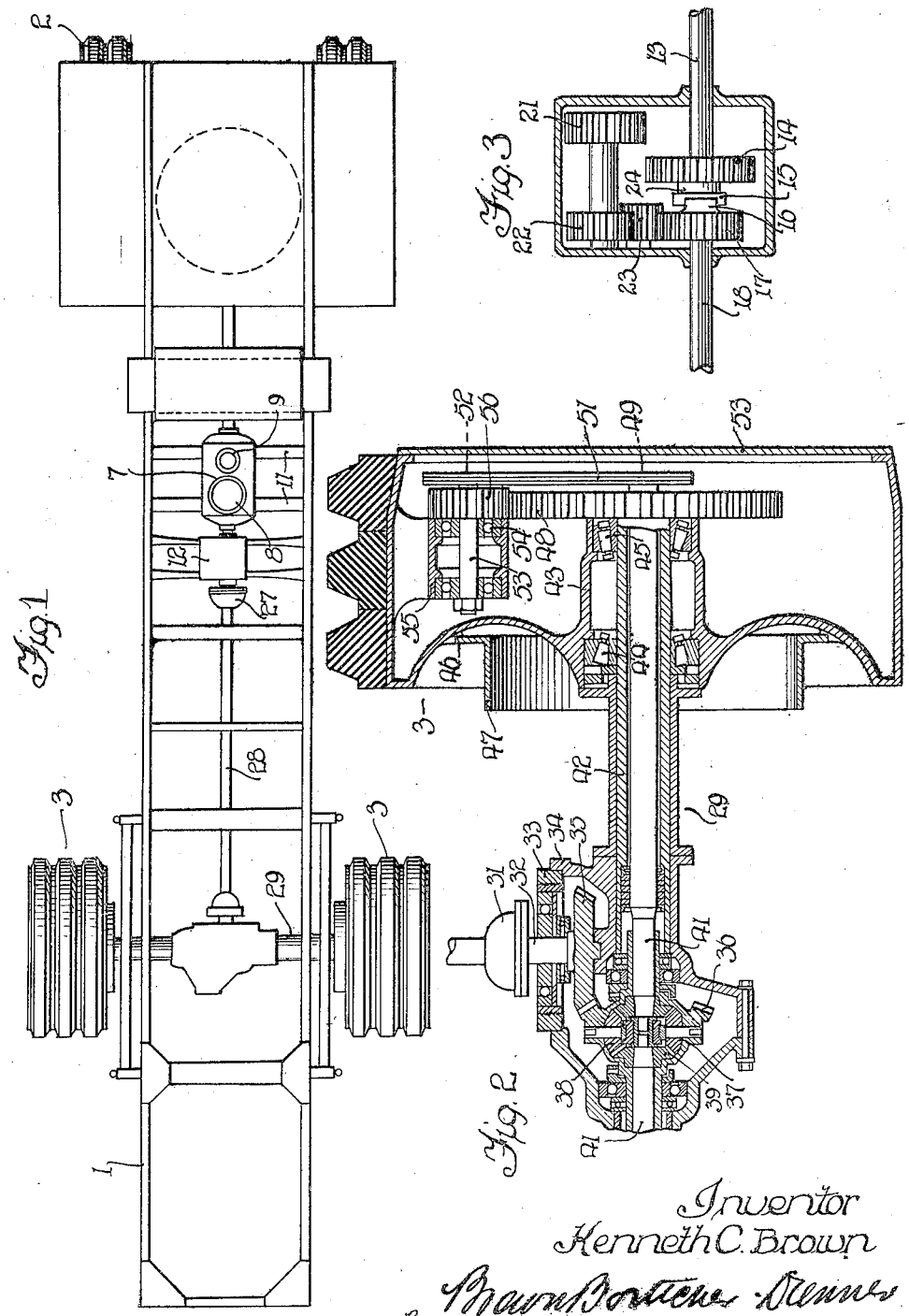

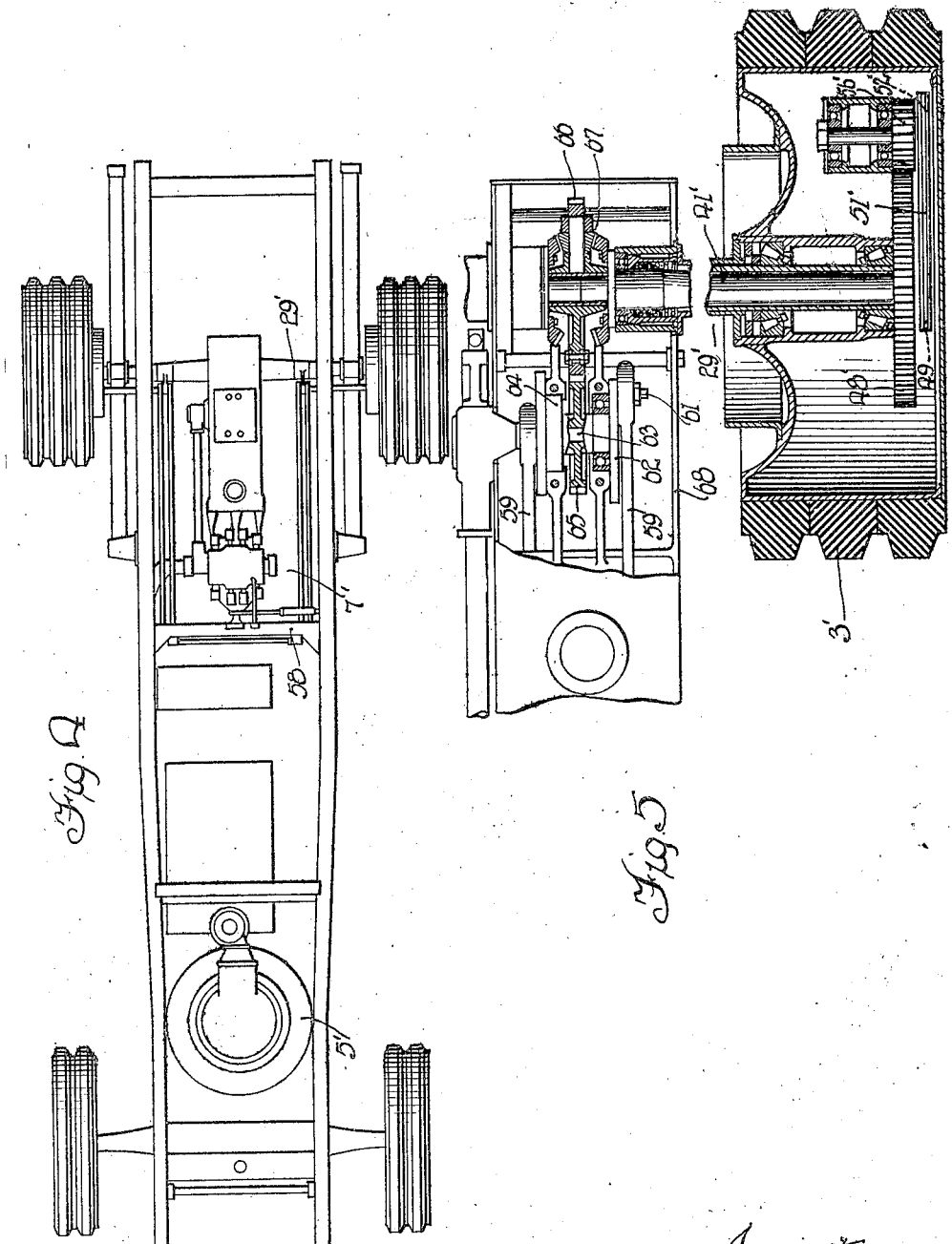

1,441,658

UNITED STATES PATENT OFFICE.

KENNETH C. BROWN, OF HINSDALE, ILLINOIS, ASSIGNOR TO WINSLOW SAFETY HIGH PRESSURE BOILER COMPANY, OF CHICAGO, ILLINOIS, A CORPORATION OF ILLINOIS.

STEAM-PROPELLED VEHICLE.

Application filed August 18, 1921. Serial No. 493,392.

*To all whom it may concern:*

Be it known that I, KENNETH C. BROWN, a citizen of the United States, residing at Hinsdale, in the county of Du Page and State of Illinois, have invented a certain new and useful Improvement in Steam-Propelled Vehicles, of which the following is a full, clear, concise, and exact description, reference being had to the accompanying drawings forming a part of this specification.

My invention relates to steam propelled vehicles and has particular reference to trucks, tractors and other heavy duty vehicles designed for low speed operation.

Steam propulsion of vehicles has important advantages inherent in a high starting torque and in the flexibility which results from the ability of the steam engine to give its entire range of torque at substantially any desired engine speed. In order to obtain the compact size, small mass of moving parts and the flexibility which is so essential in vehicle practice, it is necessary to design the steam engine for a relatively high speed of rotation, closely approaching that of an internal combustion engine. This involves a considerable speed reduction between the steam engine and the driving wheels of a slow speed vehicle. It is with the manner of obtaining this speed reduction that the present invention is primarily concerned. According to my conception I provide an arrangement of drive wherein the driving torque is maintained at a minimum through the entire transmission into the driving wheels. This is accomplished by effecting the entire speed reduction, or the major portion thereof, in speed reduction mechanism embodied in the driving wheels. This is made possible by the torque characteristics inherent in the steam engine, which torque characteristics dispense with the necessity of a change speed gear transmission and its torque boosting action, and enable the entire speed reduction and torque boost to be effected directly in the driving wheels of the vehicle. By such arrangement, the driving stresses created in the driving spindle extending transversely between the wheels, and in the propeller shaft (if any) are reduced to a minimum, whereby these shafts can be made of relatively small diameter with the attendant advantages of smaller roller bearings, a smaller differential and housing, smaller universals, etc.

The present invention also enables the desired speed reduction to be obtained with the steam engine slung directly on the rear axle, without necessitating large reduction gears between the engine and differential or between the engine and the driving spindle. Large speed reduction gears at this point are particularly objectionable because of their inaccessibility and their tendency to reduce the road clearance of the vehicle undesirably.

In the accompanying drawings illustrating my invention:

Figure 1 is a plan view of a truck chassis embodying my invention;

Figure 2 is a fragmentary sectional view of the rear axle and one of the driving wheels;

Figure 3 is a plan view of the reversing gear box with the cover removed;

Figure 4 is a plan view of a truck chassis embodying another form of my invention; and Figure 5 is a fragmentary sectional view showing the drive between the engine and the rear wheels.

Referring first to Figures 1, 2 and 3, the chassis frame 1 has front and rear wheels 2 and 3 supported by springs 4, and has a boiler 5 mounted preferably at the forward end of the truck under the hood 6. The boiler 5 may be of any type suitable for vehicle practice, and supplies steam to a reciprocating engine 7 which is preferably located under the driver's seat or in proximity to the cab of the truck. The engine 7 is illustrated as being of the two-cylinder, double acting compound type having a variable cut-off valve gear by which the engine can be simplified for the admission of boiler pressure steam into the low pressure cylinder 8 as well as into the high pressure cylinder 9. The engine is supported in any suitable manner upon cross struts 11 secured to the side channels of the chassis frame. The engine 7 may be arranged for reversing, although for simplicity of valve gear and engine construction it is often desirable to employ a reversing gear as illustrated by the reversing gear box 12 located directly in rear of the engine 7. As shown in Figure 3, the engine shaft 13 is extended into this gear box and is splined for mounting a slidable gear 14 thereon. One face of this gear is formed with a jaw clutch 15 which is adapted to cooperate with a similar clutch 16 on the opposing face of a gear 17 mounted on the short shaft 18. The end of the engine shaft 13 is journaled in a recess in the gear 17, and extending parallel with this shaft is a countershaft 19 having gears 21 and 22 rigidly mounted thereon. The gear 21 is adapted to mesh with the driving gear 14, and the gear 22 is in continuous mesh with an idler pinion 23 journaled to the side of the gear housing and meshing with the gear 17. Any suitable shifting fork is arranged to engage in a groove 24 in the side of the gear 14 for connection through a suitable shifter rod 25 with a reversing lever 26 in the driver's compartment. The gears are preferably so proportioned that when the gear 14 is shifted into mesh with the gear 21 for reverse driving of the vehicle, the shafts 13 and 18 will rotate at substantially the same speed.

I have not illustrated the various connections between the engine and boiler and the controls for the same, as these are a matter of common knowledge to those skilled in the art, and have no direct cooperation with the present invention.

A universal joint 27 connects the short shaft 18 with the propeller shaft 28 extending diagonally downward to the rear axle 29. The propeller shaft 28 connects through a lower universal joint 31 with a short shaft 32 which is journaled in the removable plate 33 mounted in the front of the differential housing 34. Within this housing the shaft 32 carries a bevel gear 35 which meshes with a bevel gear 36 formed on one side of the differential 37. By reason of the large speed reduction which can be effected in the rear wheels 3 there is no necessity for a speed reduction between the bevel gears 35 and 36, and for the purpose of retaining the driving spindles to the rear wheels at as small a diameter as possible, it may be desirable to avoid any material speed reduction between the gears 35 and 36 so that the propeller shaft and spindles will carry substantially the same torque and can thus be made relatively light. Accordingly, I have illustrated the bevel gear 35 as being of substantially the same diameter as the bevel gear 36 so that substantially a 1 to 1 ratio will prevail between the propeller shaft and driving spindles. The differential 37 is of any conventional design, the one illustrated comprising the usual bevel pinions 38 meshing with bevel gears 39 on the ends of the two driving spindles 41. The shaft 32 and the inner ends of the spindles 41 are provided with the usual roller bearings for carrying the radial and thrust loads imposed on these shafts, no specific description being made of these bearings as they are a matter of mechanical design.

The axle 29 comprises a non-rotating axle sleeve or tube 42 which extends from within the differential housing into the wheel 3. These axle sleeves at each end of the axle constitute the dead axles or supports upon the ends of which the wheels 3 are journaled and which receive the load stresses. Each wheel 3 is formed with a hollow hub 43 which is journaled on the end of the axle sleeve 42 through a pair of roller bearings 44 and 45. The web 46 of the wheel may be dished inwardly to compactly dispose part of the brake drum 47 within the plane of the wheel. The non-rotating axle sleeve 42 is extended beyond the end of the hub 43 for mounting the hub of an external gear 48. The hub of said gear is keyed or otherwise rigidly mounted on the non-rotating axle sleeve 42 so as to hold the gear 48 against rotation. Each spindle 41 extends beyond the hub of this stationary gear and mounts a sprocket 49 of relatively small size. From this central sprocket a suitable driving chain 51 is trained outwardly over a relatively large sprocket wheel 52 on a planetary shaft 53 adjacent the outer rim of the wheel. The planetary shaft 53 is journaled in roller bearings 54 which are mounted in a hollow boss 55 formed in a web or other suitable formation extending integrally from the rim or body of the wheel. A relatively small planetary gear 56 is rigidly mounted on the planetary shaft 53 directly in rear of the sprocket wheel 52, and remains in mesh with the non-rotating gear 48. The front of the wheel may be closed by any suitable closure plate 53, and the bearings for the wheel are suitably arranged to retain lubricant against leakage so that an oil bath can be retained within the wheel 3 for efficient lubrication of the above drive mechanism. In the operation of this driving mechanism, the non-rotating gear 48 constitutes a fixed track about which the planetary gear 56 revolves under the driving torque transmitted through the chain 51. The planetary gear 56 in its planetary rotation around the non-rotating gear 48 carries the wheel 3 forwardly at the reduced planetary speed of the planetary shaft 53.

It will be noted that by reason of the large speed reduction occurring between the sprockets 49 and 52 and between the planetary gears 56 and 48 the entire speed reduction from the engine speed to the traction wheel speed can be secured within the wheels 3. As before remarked, it is therefore possible to drive the spindles 41 at substantially engine speed whereby the spindles carry a relatively light torque load and can be made of relatively small diameter with the attendant advantages of small bearings, etc.

In Figures 4 and 5, I have shown the engine 7' as being slung directly on the rear axle 29'. The forward end of the engine 7' has a resilient ball mounting suspended from a cross strut 58. This engine is preferably of the two cylinder double acting type, and, as shown in Figure 5, has its connecting rods 59 connecting with crank pins 61 on the crank disks 62. These two crank disks are mounted on a crank shaft 63 supported in spaced bearings 64 between which is a driving spur gear rigidly secured to the shaft 63. This spur gear meshes with a similar gear 66 mounted on the circumference of the differential 67. The housing 68 which encloses the crank and connecting rods of the engine is also extended out around the differential 67 to house the latter. This housing may be split transversely at substantially the juncture plane between the gears 65 and 66 for permitting the convenient separation of the engine part of the housing from the differential portion for the convenient removal of the engine.

The differential is illustrated as being of the conventional bevel gear design, and operates to drive the two spindles 41' at a speed approximating or closely approaching that of the engine crank shaft 63. It is difficult to obtain any material speed reduction between the gears 65 and 66 because of the objectionably large size which this requires of the gear 66 and the reduced road clearance resulting therefrom. The axle 29' supports the two driving wheels 3' in substantially the same manner previously described, and the spindles 41' operate through the same driving relation of sprockets 49'—52', chains 51' and gears 56' and 48' to drive the wheel 3'.

In this instance, the valve gear of the engine 7' is made capable of reversing the timing of the engine for reversed drive.

I claim:

1. In a steam propelled vehicle, a frame, a rear axle transverse to the frame, wheels for the rear axle, a steam engine having a longitudinal shaft, said engine being supported on said frame forward of said rear axle, said rear axle having an axle housing, a differential gear and live spindles, reduction gearing in the wheels connecting the live spindles and said wheels, and a longitudinal propeller shaft connecting the engine shaft and said differential, said propeller shaft being driven at engine speed.

2. In a steam propelled vehicle, a longitudinal frame, a steam boiler at the front end of the frame, a transverse rear axle having a housing, differential gears and live spindles in the housing, wheels for the rear axle, reduction gears in the wheels for connecting the live spindles with the wheels, a non-reversible steam engine mounted near said boiler, said engine having a crank shaft lying longitudinally of the frame, a longitudinal propeller shaft connecting the engine shaft and the differential, and a mechanical reverse for reversing the propeller shaft with respect to the engine shaft.

In witness whereof, I hereunto subscribe my name this 22nd day of July, 1921.

KENNETH C. BROWN.